(12) United States Patent
Hirabayashi et al.

(10) Patent No.: US 7,239,480 B2
(45) Date of Patent: Jul. 3, 2007

(54) THIN FILM MAGNETIC HEAD HAVING AN UPPER POLE PORTION WITH A WIDTH THAT INCREASES TOWARDS AN ABS

(75) Inventors: Hiraku Hirabayashi, Tokyo (JP); Kiyoshi Noguchi, Tokyo (JP); Taro Oike, Tokyo (JP); Shin Narushima, Tokyo (JP); Takamitsu Sakamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 317 days.

(21) Appl. No.: 11/068,967

(22) Filed: Mar. 2, 2005

(65) Prior Publication Data

US 2005/0195526 A1    Sep. 8, 2005

(30) Foreign Application Priority Data

Mar. 5, 2004 (JP) ............................. 2004-062178
Dec. 13, 2004 (JP) ............................. 2004-360479

(51) Int. Cl.
*G11B 5/187* (2006.01)
(52) U.S. Cl. ...................................... 360/126; 360/122
(58) Field of Classification Search ................ 360/122, 360/126
See application file for complete search history.

(56) References Cited

U.S. PATENT DOCUMENTS 6,330,127 B1    12/2001    Sasaki
6,430,003 B1    8/2002    Sasaki
6,441,995 B1    8/2002    Sasaki
7,093,348 B2 *  8/2006    Sasaki ...................... 29/603.13
2002/0060878 A1 *  5/2002    Kamijima .................. 360/126
2004/0261254 A1 * 12/2004    Sasaki et al. ............ 29/603.15
2006/0103980 A1 *  5/2006    Sasaki et al. ............... 360/126

FOREIGN PATENT DOCUMENTS

JP    2000-105907    4/2000

OTHER PUBLICATIONS

U.S. Appl. No. 11/068,967, filed Mar. 02, 2005, Hirabayashi et al.
U.S. Appl. No. 11/139,697, filed May 31, 2005, Oike et al.

* cited by examiner

*Primary Examiner*—Jefferson Evans
(74) *Attorney, Agent, or Firm*—Oblon, Spivak, McClelland, Maier & Neustadt, P.C.

(57) ABSTRACT

A thin film magnetic head is provided to reduce excess magnetostatic leakage field in order to generate a sufficient recording magnetic field. The pole end portion has a width to define a recording track width. The pole rear portion has one end which is magnetically connected with the pole end portion at or in the vicinity of an edge portion of an insulating film and defines a first flare point, the other end which is connected with the upper yoke portion and defines a second flare point, and both side edges in the track width direction which are inclined so that the width in the track width direction gradually increases from the second flare point toward the first flare point. The width of the pole end portion at the first flare point is smaller than the maximum width of the pole rear portion.

12 Claims, 12 Drawing Sheets

THIN FILM MAGNETIC HEAD HAVING AN UPPER POLE PORTION WITH A WIDTH THAT INCREASES TOWARDS AN ABS

TECHNICAL FIELD

The present invention relates to a thin film magnetic head, a magnetic head apparatus, and a magnetic disk apparatus. More particularly, the present invention relates to an improvement in pole structure of a thin film magnetic head.

BACKGROUND OF THE INVENTION

In recent years, an improvement in performances of a thin film magnetic head has been demanded with an improvement in areal recording density of a hard disk apparatus. As the thin film magnetic head, there has been widely used a composite type thin film magnetic head having a configuration in which a recording head having an induced magnetic conversion element for writing and a reproducing head having a magneto-resistive (which will be referred to as MR hereinafter) element for reading are superimposed. As the MR element, a GMR element using a giant magneto-resistive (which will be referred to as GMR hereinafter) effect such as a spin valve film structure (which will be referred to as an SV film structure) or a ferromagnetic tunneling magneto-resistive element (which will be referred to as a TMR element hereinafter) forms a current main stream.

As a method of improving performances of a reproducing head, there is, e.g., a method which adapts a pattern width of a GMR film, especially an MR height. This MR height means a length (a height) from an end portion of the GMR element on an air bearing surface (which will be referred to as ABS hereinafter) side to an end portion of the same on the opposite side, and is controlled based on a polishing quantity when machining the ABS. It is to be noted that the ABS used herein is a surface facing a magnetic disk of a thin film magnetic head and also referred to as a track surface.

On the other hand, with an improvement in performances of a reproducing head, an improvement in performances of a recording head has been also demanded. As a factor which determines performances of a recording head, there is a throat height (TH). The throat height means a length (a height) of a pole portion from the ABS to an edge of an insulating film which electrically insulates a thin film coil for magnetic flux generation. In order to improve performances of a recording head, a reduction in throat height has been demanded. This throat height is also controlled based on a polishing quantity when machining the ABS.

Of performances of a recording head, a track density in a magnetic disk must be improved in order to enhance a recording density. In order to realize this, there is a need to realize a recording head having a narrow track structure in which widths of a lower pole portion (a bottom pole) and an upper pole portion (a top pole) formed with a write gap therebetween in the ABS are reduced on the order of several microns to submicron.

However, simply reducing a track width is not enough, and an intensive recording magnetic field must be generated and sufficient overwrite characteristics must be assured even when a track width is reduced.

In order to generate a sufficiently intensive magnetic recording field, approximating a flare point, where a track width is narrowed down to a predetermined width, to the ABS is effective. However, an intensity of a magnetostatic leakage field is also increased when this technique is used. A magnetostatic leakage field provokes a problem of erasing recorded information of an adjacent track. Therefore, approximating a flare point to the ABS in order to increase an intensity of a recording magnetic field is not necessarily easy. Further, when a flare point is approximated to the ABS, since a change in characteristics becomes large, instability and irregularities are apt to occur.

JP 2000-105907A (Reference 1) discloses a thin film magnetic head which enables a correct control over a pole portion width and obtains sufficient overwrite characteristics even if the pole portion width is reduced. As its concrete configuration, an upper pole portion is divided into a pole rear portion which is continuous with a yoke portion and a pole end portion which is narrower than the pole rear portion, and a track width is defined by the pole end portion. A position of a portion where the pole rear portion is coupled with the pole end portion is matched with a throat height zero position (a TH0 position) which is a reference for a throat height TH, and a widthwise direction step which varies at substantially right angles is provided here. A width of the pole rear portion in this coupling portion is set to be sufficiently larger than a width of the pole end portion in the coupling portion.

According to the conventional configuration mentioned above, expansion of a pattern width of a photo resist which is used to form the pole end portion can be avoided, and a write track width can be minimized. Furthermore, existence of the pole rear portion with a large width can prevent a magnetic flux generated in the yoke portion from being saturated before reaching the pole end portion, thereby assuring the sufficient overwrite characteristics.

However, since the overwrite characteristics are dependent on existence of the pole rear portion, a problem of a change in the overwrite characteristics due to a pattern fluctuation of the pole rear portion is involved in the thin film magnetic head disclosed in Reference 1. Reference 1 does not disclose a countermeasure for this problem.

SUMMARY OF THE INVENTION

It is an object of the present invention to provide a thin film magnetic head, a magnetic head apparatus and a magnetic disk apparatus in which can provide reduction in the excess magnetostatic leakage field and stabilization in characteristics even if the flare point is set near to the ABS in order to generate a sufficient recording magnetic field.

It is another object of the present invention to provide a thin film magnetic head, a magnetic head apparatus and a magnetic disk apparatus which can assure stable overwrite characteristics even if there are variations in upper pole portion patterns.

To achieve the above objects, a thin film magnetic head according to the present invention comprises a recording element, and the recording element comprises a lower magnetic film, an upper magnetic film, a gap film and a thin film coil.

The lower magnetic film comprises a lower yoke portion and a lower pole portion, and the lower pole portion is provided at one end of the lower yoke portion that is on the side facing a recording medium. The upper magnetic film comprises an upper yoke portion and an upper pole portion. The upper yoke portion is provided at a distance from the lower yoke portion and magnetically coupled with the lower yoke portion by the rear coupling portion that is on the rear side in relation to the side facing a recording medium. The thin film coil is provided with an insulating film and arranged between the lower yoke portion and the upper yoke portion.

The upper pole portion comprises a pole end portion and a pole rear portion, and faces the lower pole portion with the gap film therebetween. The pole end portion has a width to define a recording track width. The pole rear portion has one end that is magnetically connected with the pole end portion at or in the vicinity of an edge of the insulating film and forms a first flare point at which the width in a track width direction increases, the other end that is coupled with the upper yoke portion and forms a second flare point at which the width in the track width direction increases, and both side edges in the track width direction are inclined so that the width in the track width direction gradually increases from the second flare point toward the first flare point. The width of the pole end portion at the first flare point is smaller than the maximum width of the pole rear portion.

As described above, in the thin film magnetic head of the present invention, the upper yoke portion is provided at a distance from the lower yoke portion, and magnetically coupled with the lower yoke portion by the rear coupling portion that is on the rear side in relation to the side facing a recording medium. The upper pole portion faces the lower pole portion with the gap film therebetween. The thin film coil is provided with an insulating film and arranged between the lower yoke portion and the upper yoke portion. Therefore, the upper yoke portion, the upper pole portion, the gap film, the lower pole portion, the lower yoke portion and the rear coupling portion form a thin film magnetic circuit for a magnetic flux generated by a current flowing through the thin film coil.

The upper pole portion comprises a pole end portion and a pole rear portion. The pole end portion has a width to define a recording track width. The pole rear portion has one end that is magnetically coupled with the pole end portion at or in the vicinity of an edge of the insulating film and forms a first flare point, and the other end that is coupled with the upper yoke portion and forms a second flare point. The width of the pole end portion at the first flare point is smaller than the maximum width of the pole rear portion. The thin film magnetic head according to this structure demonstrates high performances in the overwrite characteristics. That is, in this upper pole portion, the pole rear portion coupled with the pole end portion has a width greatly larger than a width of the pole end portion which defines a track width on a recording medium at a throat height zero position, and a volume of the pole rear portion is larger than that of a conventional portion. Therefore, a magnetic flux generated in the yoke portion by the thin film coil is not saturated in the pole rear portion, and can sufficiently reach the pole end portion. Therefore, even if the pole end portion is compatible with a narrow track width of, e.g., submicron, it is possible to obtain an intensity which is sufficient as a magnetic flux for overwriting. That is, a narrow track can be realized while assuring the sufficient overwrite characteristics.

In addition, the both side edges of the pole rear portion in the track width direction are inclined so that the width in the track width direction gradually increases from the second flare point toward the first flare point. Therefore, the stable overwrite characteristics can be assured even if the maximum width of the pole rear portion changes in a range of an inclination angle.

It is to be noted that, as the thin film magnetic head, a type that the upper yoke portion and the upper pole portion are composed of a substantially flat and continuous film (which will be referred to as a planar type) and a type that the upper yoke portion and the upper pole portion are separated from each other and an end portion of the upper yoke portion is superposed on the upper pole portion (which will be referred to as an HS type) are known, but the present invention can be applied to the both types, to produce homogeneous effects and advantages.

The present invention further discloses a magnetic head apparatus in which the thin film magnetic head is combined with a head support apparatus and a magnetic disk apparatus in which this magnetic head apparatus is combined with a magnetic disk.

Other feathers, effects and advantages of the present invention will be further described in detail with reference to the accompanying drawings.

DESCRIPTION OF THE PREFERRED EMBODIMENTS

Figure 1:
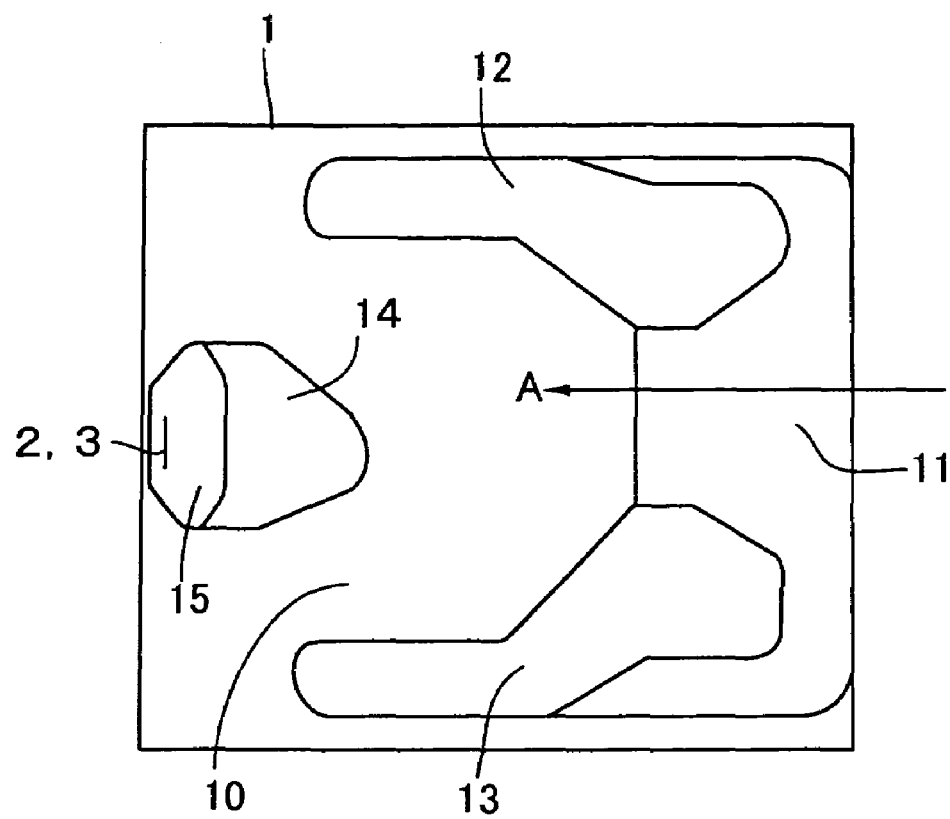
FIG. 1 is a view showing an example of a thin film magnetic head, which is a plan view seen from a surface side which faces a medium.
Figure 2:
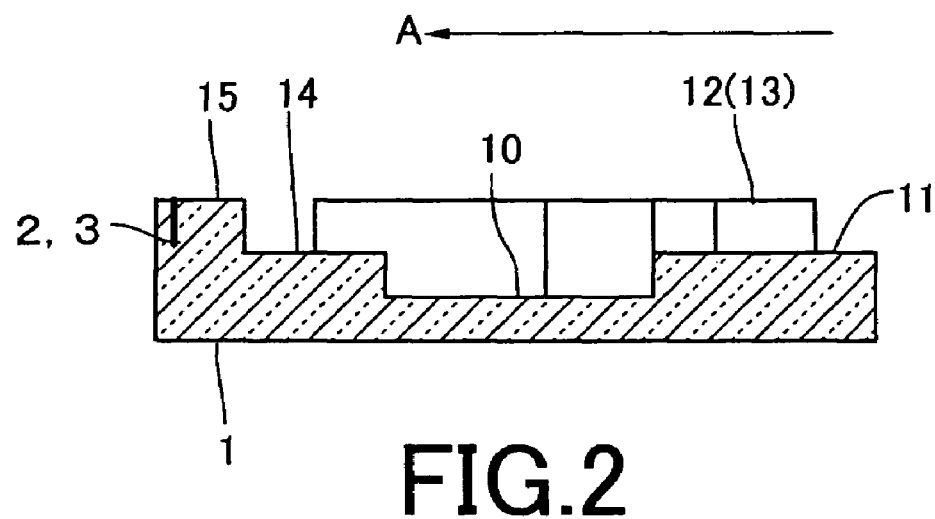
FIG. 2 is a cross-sectional view of the thin film magnetic head depicted in FIG. 1.
Figure 3:
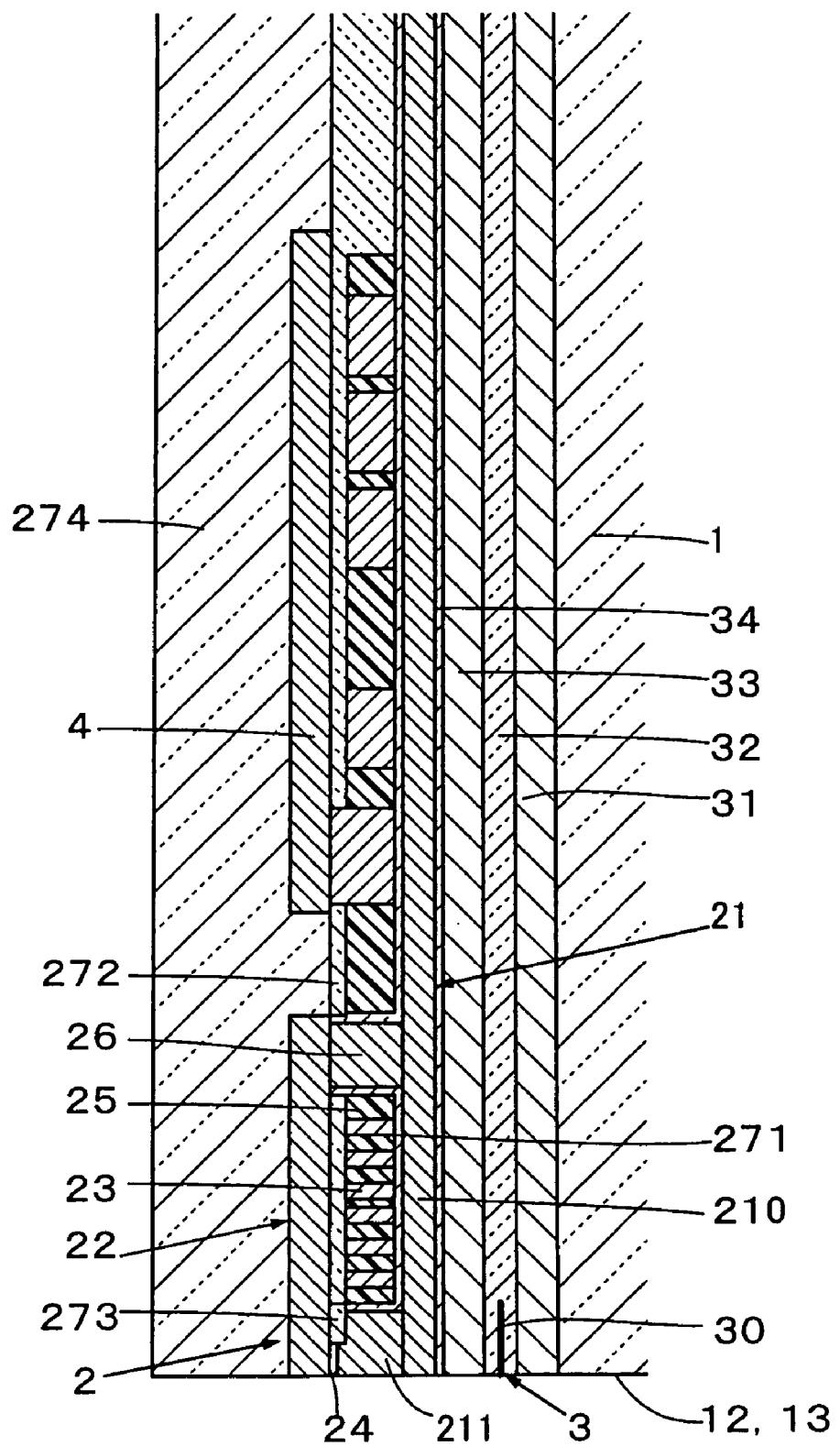
FIG. 3 is an enlarged view showing a magnetic conversion element potion in the thin film magnetic head depicted in FIGS. 1 and 2.
Figure 4:
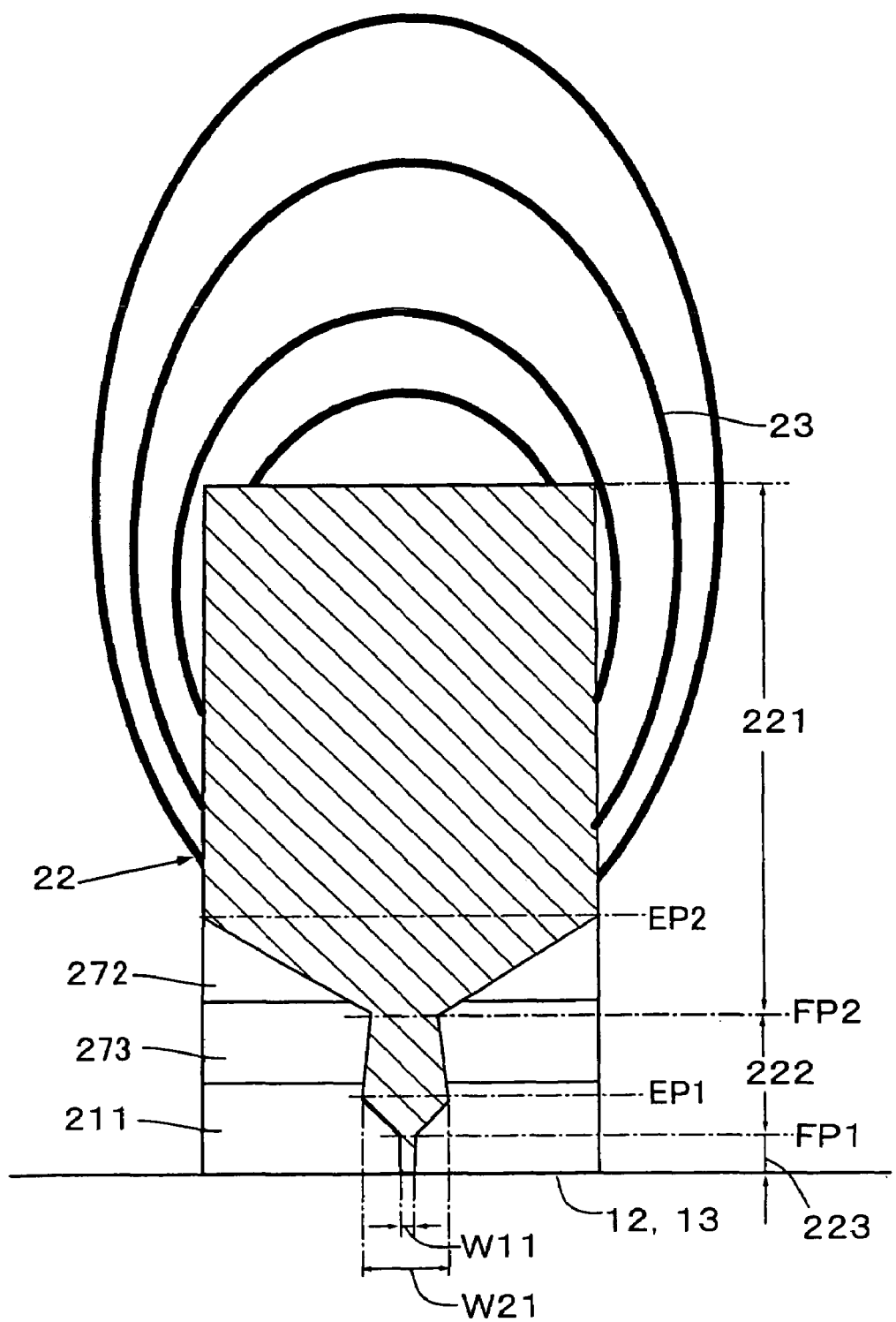
FIG. 4 is a modeling plan view showing a configuration of the thin film magnetic head depicted in FIGS. 1 to 3.
Figure 5:
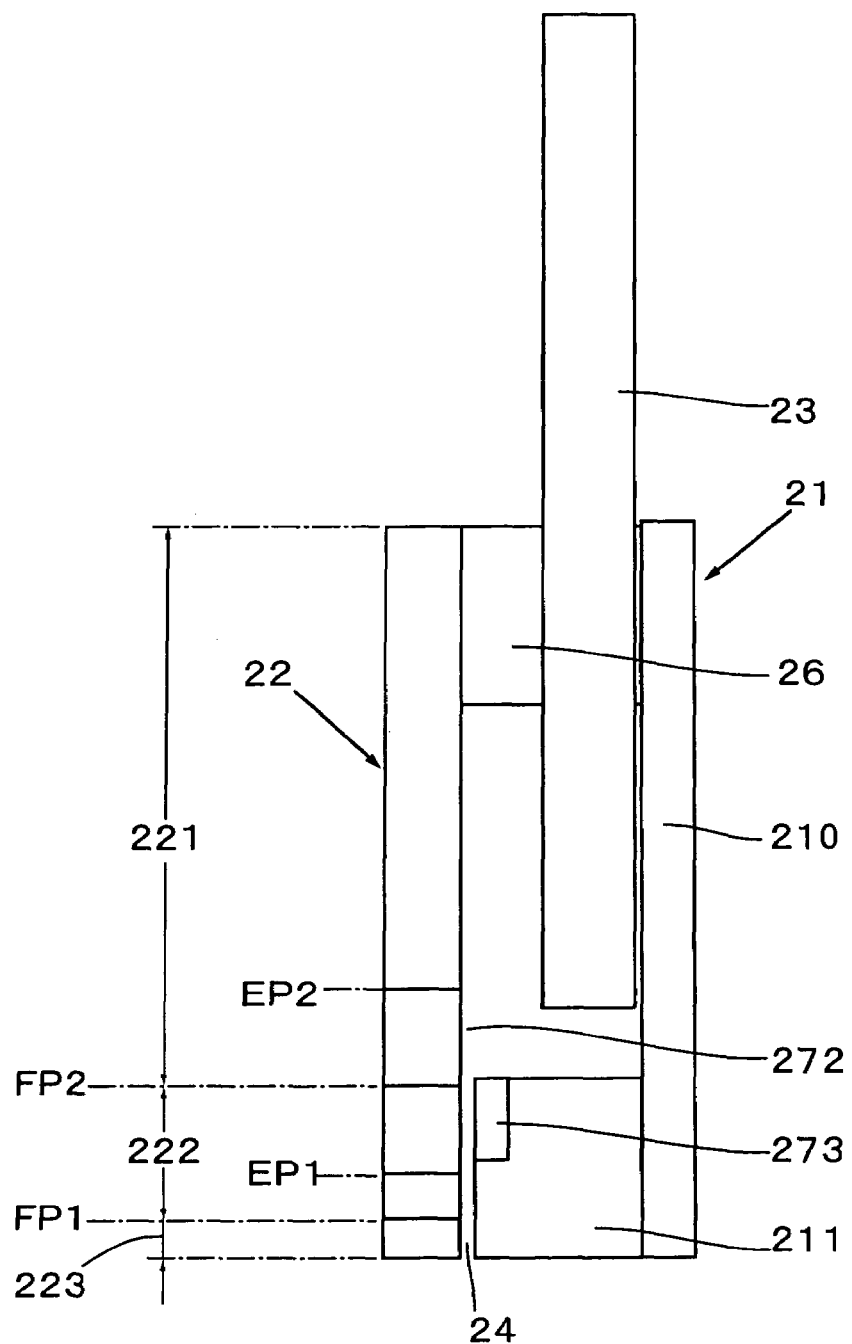
FIG. 5 is a side view associated with FIG. 4.

FIG. 1 is a view showing an example of a thin film magnetic head, which is a plan view seen from a surface side facing a medium; FIG. 2 is a cross-sectional view of the thin film magnetic head depicted in FIG. 1; FIG. 3 is an enlarged view of a magnetic conversion element portion in the thin film magnetic head depicted in FIGS. 1 and 2; FIG. 4 is a modeling plan view showing a configuration of the thin film magnetic head depicted in FIGS. 1 to 3; and FIG. 5 is a side view associated with FIG. 4. The illustrated thin film magnetic head comprises a slider substrate 1, a write element 2 and a read element 3.

The slider substrate 1 is, for example, formed of a ceramic material such as AlTiC ($Al_2O_3$—TiC), and has a geometric shape for a flying characteristic control on a surface opposed to a medium. As a typical example of such a geometric shape, the embodiment shows an example in which a first step portion 11, a second step portion 12, a third step portion 13, a fourth step portion 14 and a fifth step portion 15 are provided on a base surface 10 of the slider substrate 1. The base surface 10 serves as a negative pressure generation portion with respect to an air flow direction indicated by an arrow A, and the second step portion 12 and the third step portion 13 constitute a step-shaped air bearing which rises from the first step portion 11. The surface of each of the second step portion 12 and the third step portion 13 serves as an ABS.

The fourth step portion 14 rises in a step-like form from the base surface 10, and the fifth step portion 15 rises in a step-like form from the fourth step portion 14. The write element 2 and the read element 3 are provided to the fifth step portion 15.

Referring to FIG. 3, the read element 3 includes an MR element 30. The MR element 30 includes an SV film or a TMR film. In case of the SV film, a CIP type or a CPP type is used. The TMR film essentially flows a sense current in a direction vertical to a film surface. The MR element 30 is arranged in an insulating gap film 32 between a first shield layer 31 and a second shield layer 33.

The write element 2 includes a lower magnetic film 21, an upper magnetic film 22, a thin film coil 23 and a write gap film 24. The lower magnetic film 21 has a lower yoke portion 210 and a lower pole portion 211. The lower pole portion 211 is provided so as to protrude at an end portion of the lower yoke portion 210 on a side facing a recording medium, i.e., a side where the ABS 12, 13 is provided. The lower yoke 210 is provided on an insulating film 34 which is adjacent to the second shield film 33.

The write gap film 24 is provided between the lower pole portion 211 of the lower magnetic film 21 and an upper pole portion (222, 223) of the upper magnetic film 22. In the upper magnetic film 22, the upper pole portion faces the lower pole portion 211 of the lower magnetic film 21 through the write gap portion 24.

The lower pole portion 211 has a concave portion on its upper surface facing the write gap film 24, an insulating film 273 is arranged in this concave portion, and an end portion of the ABS 12, 13 of this insulating film 273, i.e., a contact boundary between the insulating film 273 and an inner wall surface of the concave portion of the lower pole portion 211 determines a throat height zero.

The upper magnetic film 22 has an upper yoke portion 221 and an upper pole portion (222, 223). Although a distinction between the yoke portion and the pole portion is not necessarily clear on the magnetic circuit, these portions are distinguished from each other based on sizes of their superficial contents in the present invention. That is, a part having a large superficial content is referred to as the yoke portion, and a part having a small superficial content as a result of being narrowed down from this large superficial content is referred to as the pole portion. The upper magnetic film 22 is covered with an insulating film 274 formed of, e.g., alumina.

In the present invention, the upper yoke portion 221 and the upper pole portion (222, 223) exist in the same plane. The upper yoke portion 221 is distanced from the lower yoke portion 210, and magnetically coupled with the lower yoke portion 210 by a rear coupling portion 26 which is positioned on the rear side as seen from the side where the ABS 12, 13 is provided which faces a recording medium. The thin film coil 23 is electrically insulated by insulating films 25 and 271 to 273 which exist between the lower yoke portion and the upper yoke portion 221. The insulating films 25 and 271 to 273 are constituted of an organic insulating film and an inorganic insulating film or a combination of these films.

The upper pole portion (222, 223) includes a pole end portion 223 and a pole rear portion 222, and faces the lower pole portion 211 with the write gap film 24 therebetween. The pole end portion 223 has a width W11 which defines a recording track width. The pole end portion 223 maintains substantially the same width W11 over its entire length.

A configuration of the upper pole portion (222, 223) constituting the upper magnetic film 22 is a characteristic part of the present invention. This point will now be described with reference to FIGS. 4 and 5.

The pole rear portion 222 has one end which is magnetically coupled with the pole end portion 223 at or in the vicinity of an edge portion of the insulating film 273 and thereby constitutes a first flare point FP1. In the present invention, the flare point means a start point from which the width starts to increase. The pole end portion 223 maintains substantially the same width W11 from the ABS 12, 13 to the first flare point FP1. The first flare point FP1 is positioned on the side where the ABS 12, 13 is provided apart from the contact boundary with the inner wall surface of the concave portion of the lower pole portion 211 which gives the throat height zero.

The pole rear portion 222 is coupled with the pole end portion 223 at the first flare point FP1, and its width increases toward the rear side until a first flare end point EP1. Additionally, at the first flare end point EP1, a maximum width W21 is obtained. In the illustrated embodiment, the first flare end point EP1 is positioned on the side where the ABS 12, 13 is provided slightly apart from the contact boundary with the inner wall surface of the concave portion of the lower pole portion 211 which gives the throat height zero.

Figure 6:
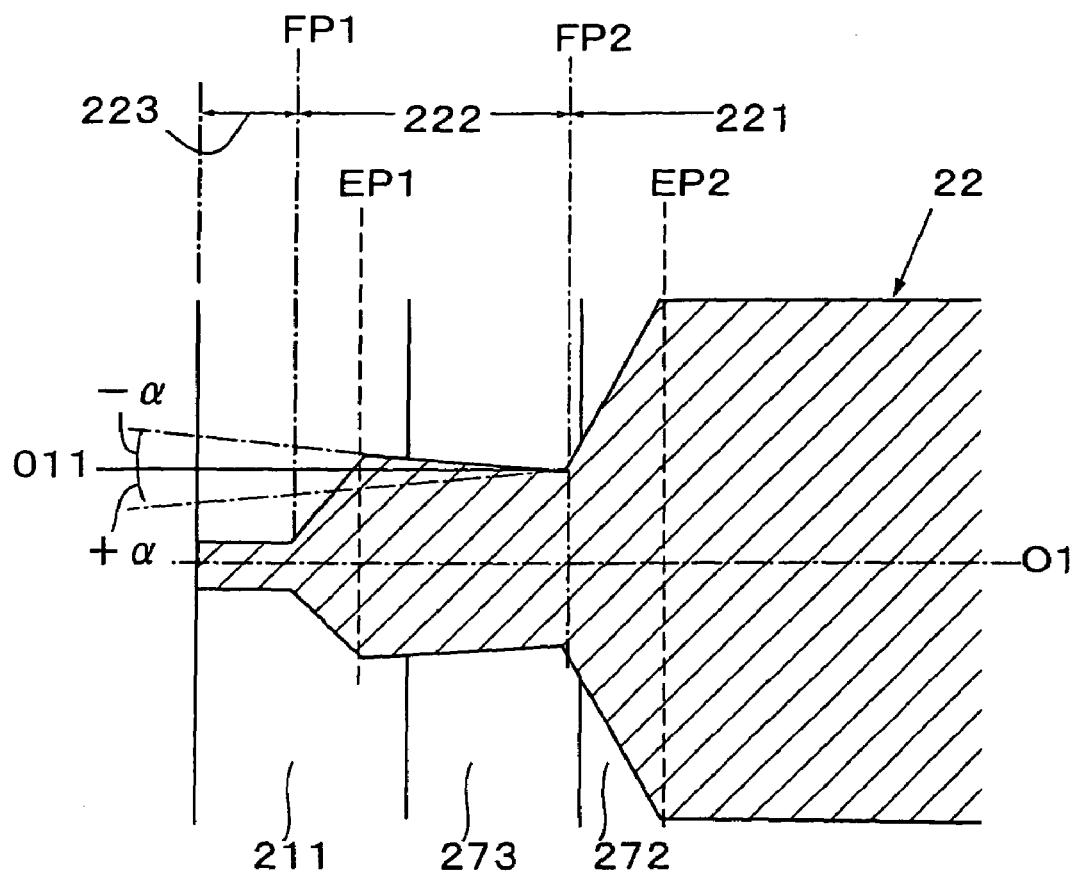
FIG. 6 is a view illustrating a configuration of an upper yoke portion in the thin film magnetic head depicted in FIGS. 1 to 5.

In the pole rear portion 222, the other end on the side opposite to one end which functions as a part coupled with the pole end portion 223 is coupled with the upper yoke portion 221, and thereby constitutes a second flare point FP2. In the pole rear portion 222, as shown in FIG. 6, both side edges in the widthwise direction are inclined at an angle α so that the width gradually increases from the second flare point FP2 toward the first flare point FP1. Therefore, the width W11 of the pole end portion 223 at the first flare point FP1 necessarily becomes smaller than the maximum width W21 of the pole rear portion 222. As shown in FIG. 6, the angle α is an angle which has a vertical line O1 with respect to the ABS 12, 13 and its horizontal line O11 as a reference (an angle zero).

The width of the upper yoke portion 221 begins to increase from the second flare point FP2. The width of the upper yoke portion 221 gradually increases toward the rear side, and the maximum width is obtained at a second flare end point EP2.

In the thin film magnetic head according to the illustrated embodiment, the upper magnetic film 22 has the upper yoke portion 221 and the upper pole portion (222, 223), and the upper yoke portion 221 and the upper pole portion (222, 223) exist in the same plane, thereby obtaining the planar type thin film magnetic head. Such a structure can be readily manufactured. However, the thin film magnetic head according to the present invention is not restricted to the illustrated planar type. It can be extensively applied to any yoke structure.

The upper yoke portion 221 is distanced from the lower yoke portion 210, and magnetically coupled with the lower yoke portion 210 by the rear coupling portion 26 positioned on the rear side as seen from the side where the ABS 12, 13 is provided. The upper pole portion (222, 223) faces the lower pole portion 211 with the write gap film 24 therebetween. The thin film coil 23 is arranged between the lower yoke portion 210 and the upper yoke portion 221 through the insulating film. Therefore, the upper yoke portion 221, the upper pole portion (222, 223), the write gap film 24, the lower pole portion 211, the lower yoke portion 210 and the rear coupling portion 26 constitute a thin film magnetic circuit for a magnetic flux generated due to a current flowing through the thin film coil 23.

The upper pole portion (222, 223) includes the pole end portion 223 and the pole rear portion 222. The pole end portion 223 has a width W11 which defines a recording track width. The pole end portion 222 has one end which is magnetically coupled with the pole end portion 223 at or in the vicinity of an edge portion of the insulating film 273 and thereby constitutes a first flare point FP1, and the other end which is coupled with the upper yoke portion 221 and thereby constitutes a second flare point FP2. The width W11 of the pole end portion 223 at the first flare point FP1 is smaller than the maximum width W21 of the pole rear portion 222. The thin film magnetic head according to this structure demonstrates high performances in overwrite characteristics.

That is, this upper pole portion (222, 223) has a width W21 which is greatly larger than the width W11 of the pole end portion 223 which defines a track width on a recording medium at a throat height zero position, and a volume of the pole rear portion 222 is larger than that of a conventional portion. Therefore, a magnetic flux generated in the yoke portion by the thin film coil 23 is not saturated in the pole rear portion 222, and sufficiently reaches the pole end portion 223. Therefore, even if the pole end portion 223 is compatible with a narrow track width of, e.g., submicron, it is possible to obtain an intensity which is sufficient as a magnetic flux for overwriting. That is, a narrow track can be realized while the sufficient overwrite characteristics can be assured.

In addition, both side edges of the pole rear portion 222 in the widthwise direction are inclined at the angle α so that the width gradually increases from the second flare point FP2 toward the first flare point FP1. Therefore, the stable overwrite characteristics can be assured even if the maximum width of the pole rear portion 222 varies in a range of the inclination angle α.

Figure 7:
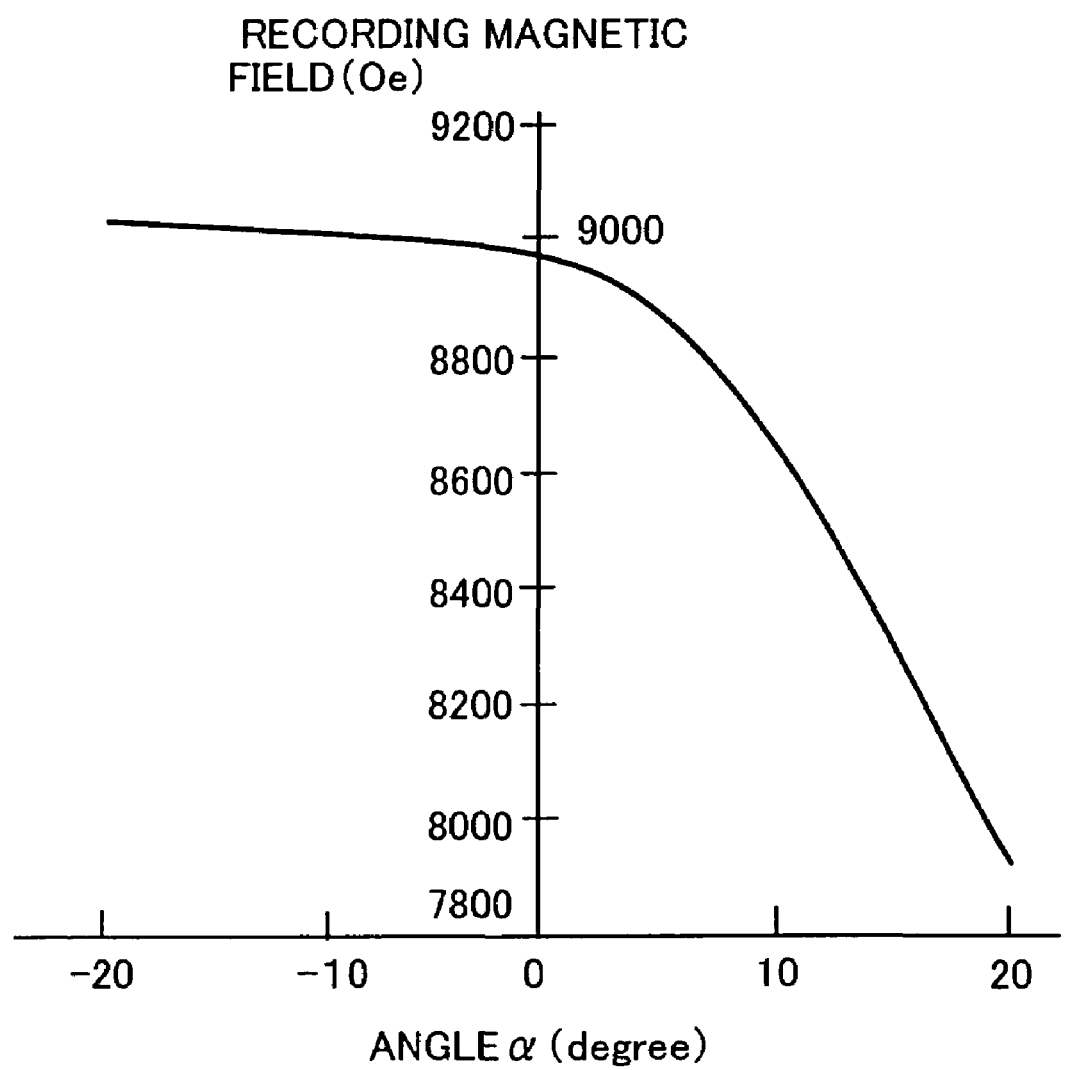
FIG. 7 shows data of a relationship between an angle α and a recording magnetic field (Oe) in a thin film magnetic head according to the present invention.

FIG. 7 shows data of a relationship between the angle α and a recording magnetic field (Oe). As shown in drawing, when an area where the angle α is a negative angle, i.e., the both side edges of the pole rear portion 222 in the widthwise direction are inclined at the angle α in the direction along which the width gradually increases from the second flare point FP2 toward the first flare point FP1, a fluctuation range of a recording magnetic field with respect to a change in the angle α is very small. Furthermore, the highly stable recording magnetic field can be obtained. Therefore, a narrow track can be realized while the sufficient overwrite characteristics can be assured.

Figure 8:
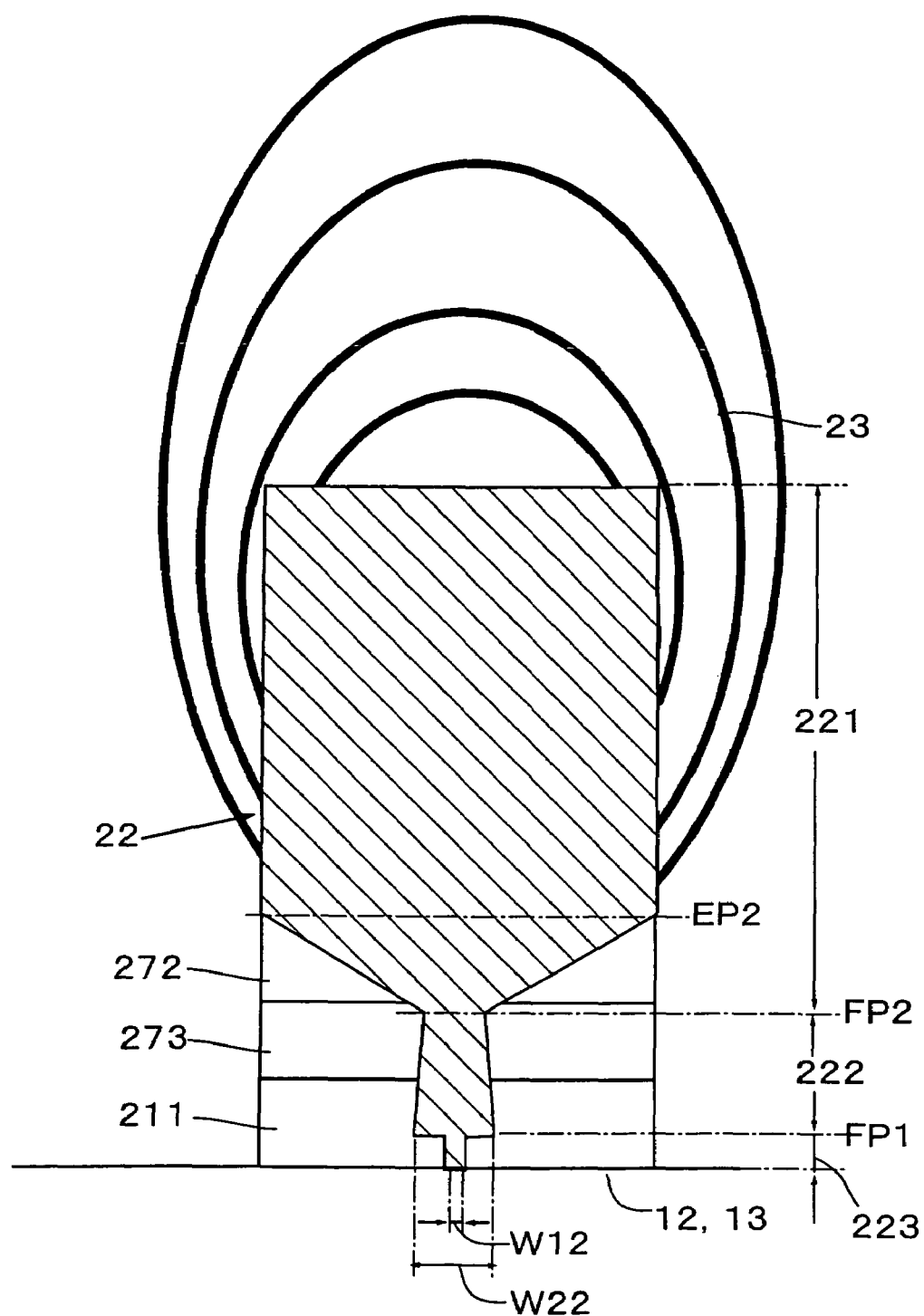
FIG. 8 is a view showing still another embodiment of the thin film magnetic head according to the present invention.

FIG. 8 is a view showing still another embodiment of the thin film magnetic head according to the present invention. In the drawing, the same reference numerals denote parts corresponding to the constituent parts shown in FIG. 4. This embodiment is characterized in that a forefront edge of the pole rear portion 222 is provided at the first flare point FP1 and the pole rear portion 222 has the maximum width W22 at this position. In other words, the pole rear portion 222 has a relationship in which its forefront edge becomes substantially orthogonal to the side surface of the pole end portion 223. This embodiment likewise demonstrates the same effects and advantages as those of the foregoing embodiment.

Figure 9:
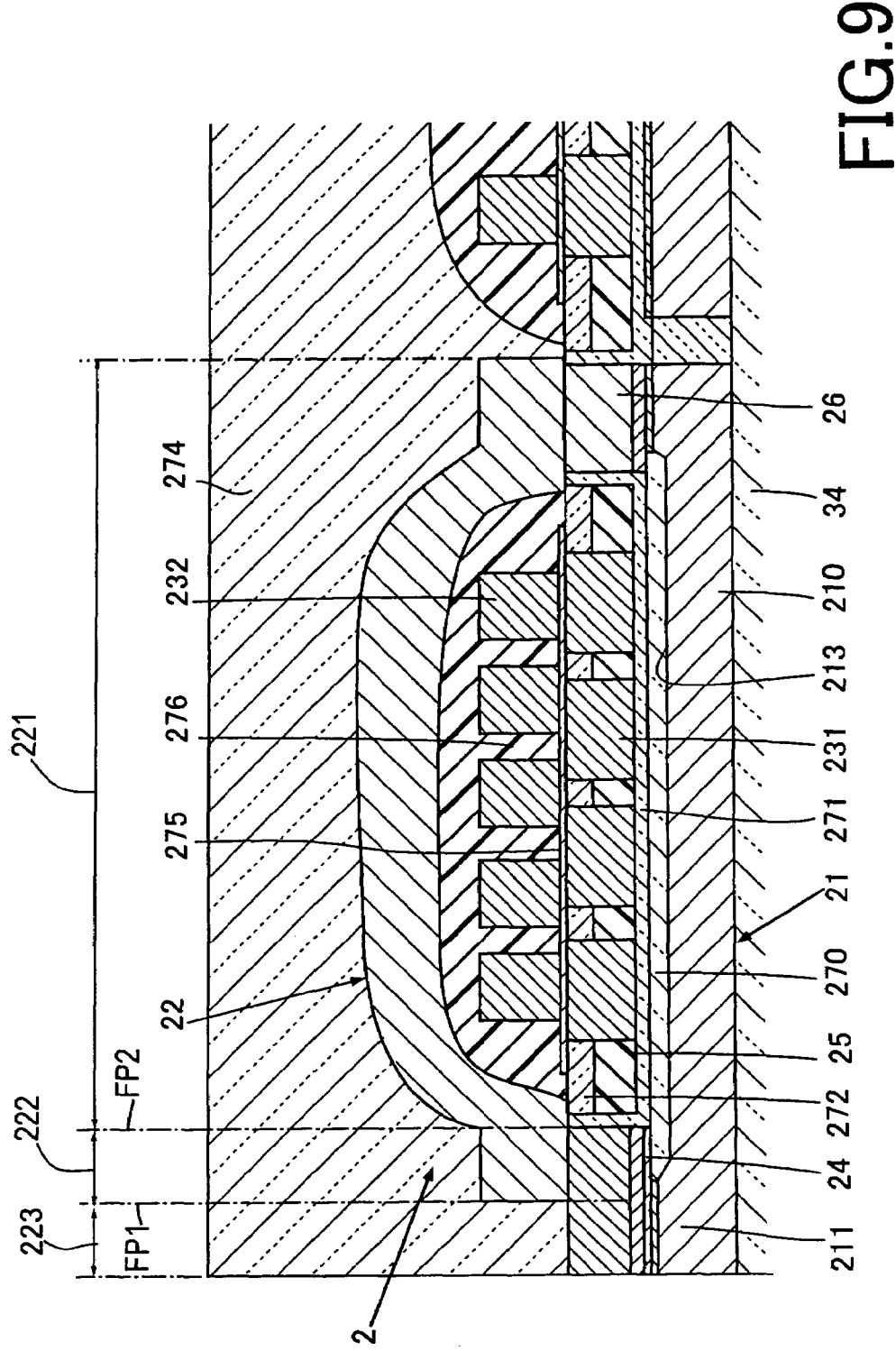
FIG. 9 is a cross-sectional view showing yet another embodiment of the thin film magnetic head according to the present invention.
Figure 10:
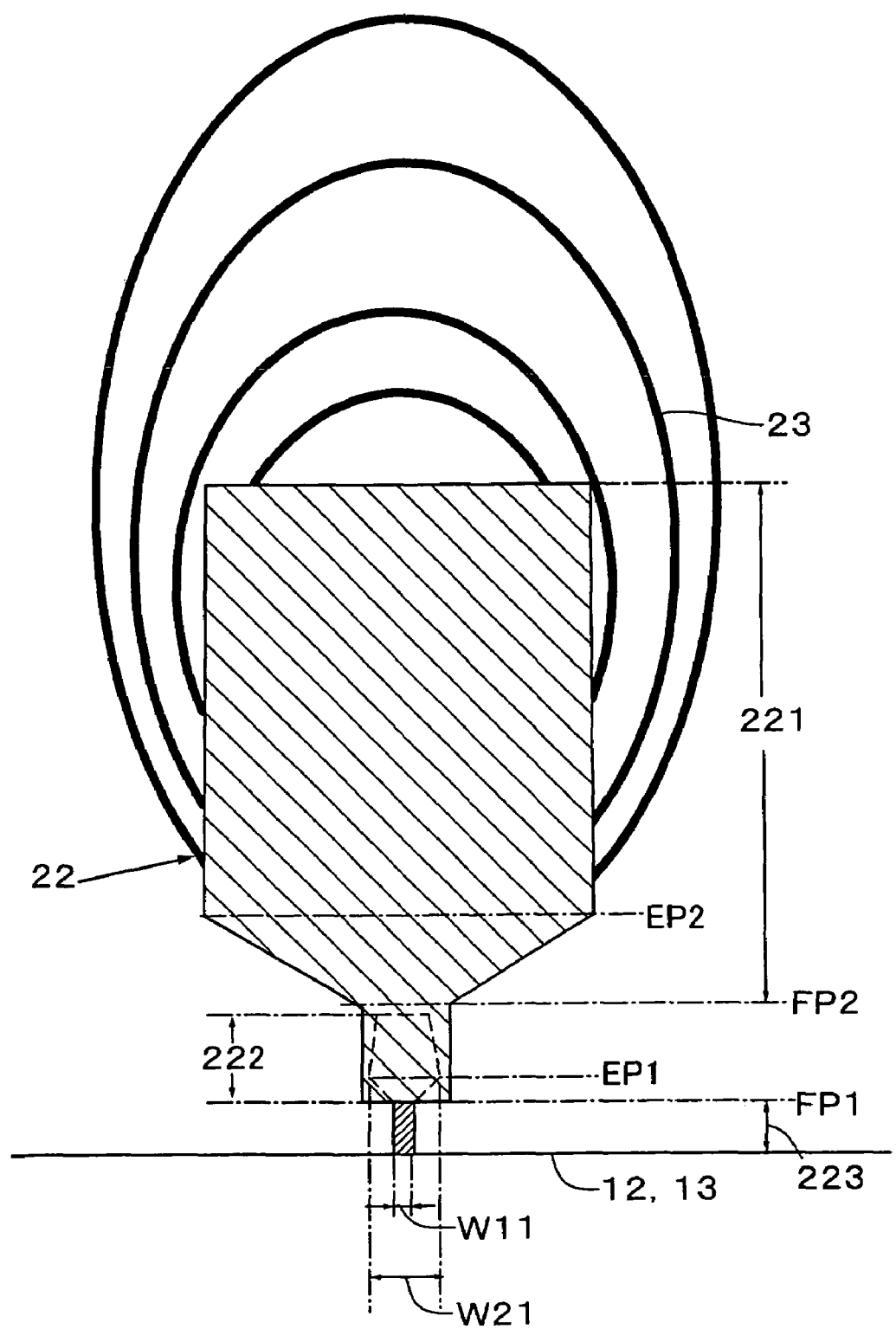
FIG. 10 is an enlarged plan view showing a pole portion in the thin film magnetic head depicted in FIG. 9.

FIG. 9 is a cross-sectional view showing yet another embodiment of the thin film magnetic head according to the present invention, and FIG. 10 is an enlarged plan view showing the upper pole portion and the upper yoke portion of the thin film magnetic head depicted in FIG. 9. In FIGS. 9 and 10, the same reference numerals denote parts corresponding to the constituent parts depicted in FIGS. 1 to 6. Reference numerals 270 and 275 designate insulating films formed of, e.g., alumina; reference numerals 231 and 232, thin film coils; and reference numeral 213, a concave portion provided to the lower yoke portion 210.

This embodiment adopts a structure (an HS type) in which the upper pole portion (222, 223) is separated from the upper yoke portion 221 and an end portion of the upper yoke portion 221 is superposed on the upper pole portion (222, 223). The upper pole portion (222, 223) includes a pole end portion 223 and a pole rear portion 222. The pole end portion 223 has a width W11 which defines a recording track width. The pole rear portion 222 is continuous with the pole end portion 223 at a part corresponding to the first flare point FP1. The width W11 of the pole end portion 223 at the first flare point FP1 is smaller than the maximum width W21 of the pole rear portion 222. The thin film magnetic head according to this structure demonstrates high performances in the overwrite characteristics.

The upper yoke 221 adheres to a surface of the insulating film 276, has a front end portion superposed on the pole rear portion 222, rises along a rising oblique surface of the insulating film 276 on the rear side, and has the second flare point FP2 in the vicinity of its rising part.

It seems that the thin film magnetic head depicted in FIGS. 9 and 10 is structurally different from the thin film magnetic head (which is of the planar type) depicted in FIGS. 1 to 6 in that the second flare point FP2 is set at the upper yoke portion 221 provided separately from the upper pole portion (222, 223), but it can be considered that the second flare point FP2 is shifted in parallel toward the upper side from the position in the planar type depicted in FIGS. 1 to 6, and hence these two thin film magnetic heads are functionally homogeneous.

Figure 11:
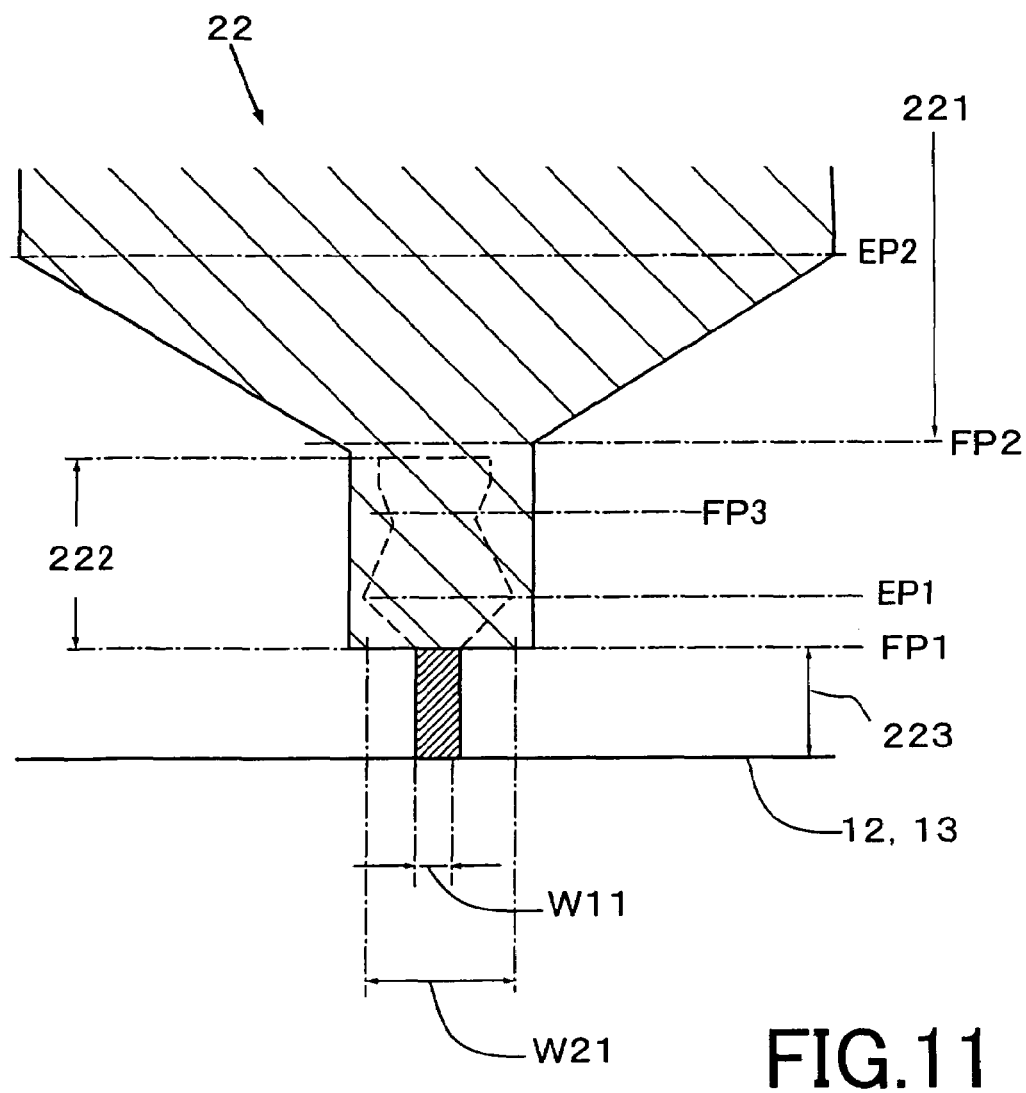
FIG. 11 is an enlarged plan view showing another example of the pole portion in the thin film magnetic head depicted in FIG. 9.

FIG. 11 is an enlarged plan view showing another embodiment of the pole portion in the thin film magnetic head depicted in FIG. 9. In this embodiment, a third flare point FP3 is further set on the rear side of the first flare end point EP1. This embodiment suggests that the number of flare points can be increased/decreased without being restricted to that provided in the foregoing illustrated embodiments.

Figure 12:
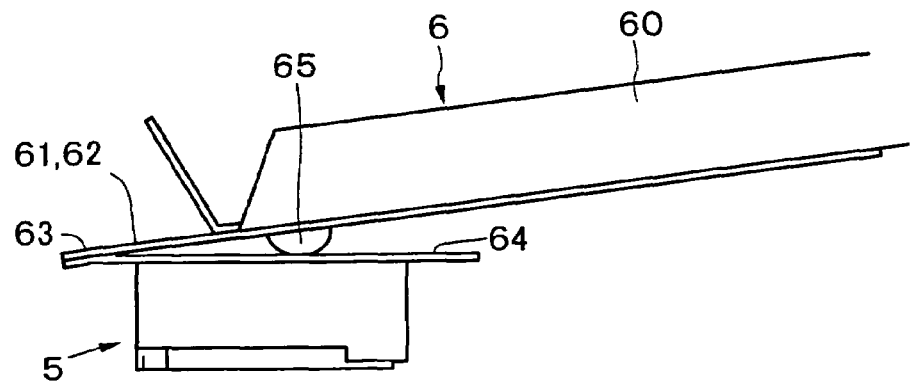
FIG. 12 is a front view of a magnetic head apparatus.
Figure 13:
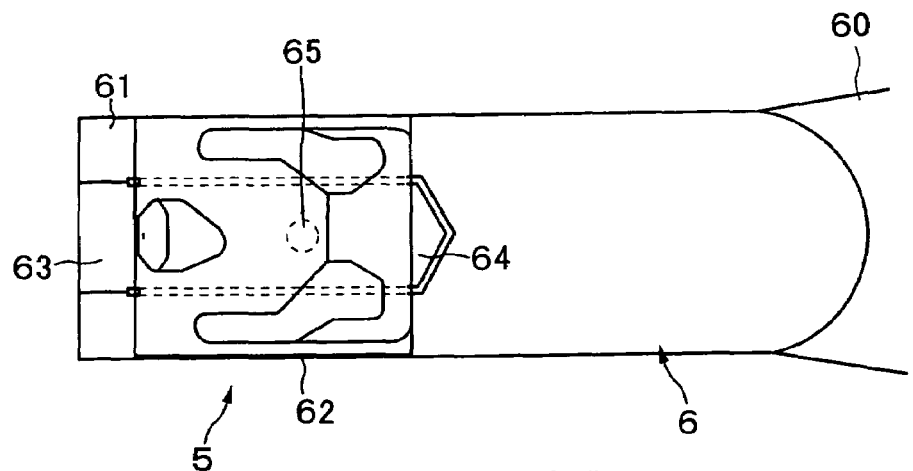
FIG. 13 is a bottom view of the magnetic head apparatus depicted in FIG. 12.

FIG. 12 is a front view of a magnetic head apparatus, and FIG. 13 is a bottom view of the magnetic head apparatus depicted in FIG. 12. The illustrated magnetic head apparatus includes a thin film magnetic head 5 depicted in FIGS. 1 to 10, and a head suspension 6. The head suspension 6 has a structure in which a flexible body formed of a thin metal sheet is attached at a free end provided at one end of a support 60 likewise formed of a thin metal sheet in the longitudinal direction and the thin film magnetic head 5 is attached on a lower surface of this flexible body.

Specifically, the flexible body has two outer frame portions 61 and 62 which extend in substantially parallel with the longitudinal axis of the support 60, a lateral frame 63 which couples the outer frame portions 61 and 62 at an end apart from the support 60, and a tongue-like piece 64 which extends in substantially parallel with the outer frame portions 61 and 62 from a substantially central portion of the lateral frame 63 and has a front end as a free end. One end on the side opposite to the direction along which the lateral frame 63 is provided is attached in the vicinity of the free end of the support 60 by means such as welding.

A load protrusion 65 having, e.g., a semispherical shape is provided on a lower surface of the support 60. This load protrusion 65 transmits a load force from the free end of the support 60 to the tongue-like piece 64.

The thin film magnetic head 5 is attached on a lower surface of the tongue-like piece 64 by means such as welding. The thin film magnetic head 5 is supported so that a pitch operation or a rolling operation is allowed.

The head suspension 6 which can be applied to the present invention is not restricted to the foregoing embodiment, and a head support device which has been or will be proposed can be extensively applied. For example, it is possible to use a head support device in which the support 60 and the tongue-like piece 64 are integrated by using a flexible polymeric wiring board such as a TAB tape. Furthermore, a head support device having a conventionally known gimbal structure can be used without restraint.

Figure 14:
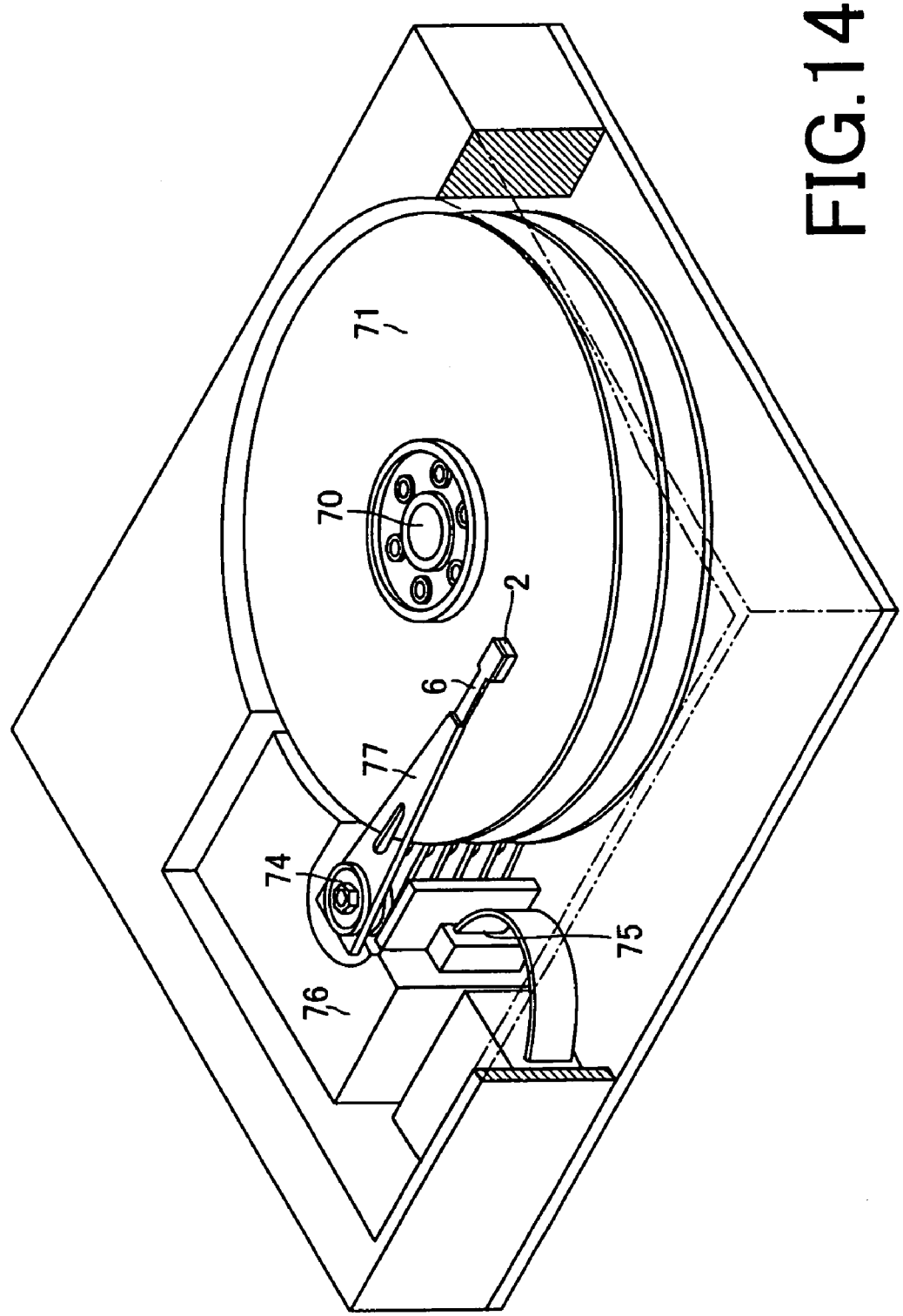
FIG. 14 is a perspective view of a magnetic disk apparatus according to the present invention.

FIG. 14 is a perspective view showing a concrete structure of a magnetic disk apparatus. The illustrated magnetic disk apparatus comprises a magnetic disk 71 rotatably provided around a shaft 70, which can swivel, a thin film magnetic head 5 which records and reproduces information with respect to the magnetic disk 71, and an assembly carriage device 73 which positions the thin film magnetic head 5 on a track of the magnetic disk 71.

The assembly carriage device 73 is mainly constituted of a carriage 75 which can swivel around a shaft 74 and an actuator 76 which drives this carriage 75 to swivel and is formed of, e.g., a voice coil motor (VCM).

Base portions of a plurality of drive arms 77 stacked in a direction of the shaft 74 are attached to the carriage 75, and a head suspension assembly 6 having the thin film magnetic head 5 mounted thereon is secured to a pole end portion of each drive arm 77. In each head suspension assembly 6, the thin film magnetic head 5 provided at its pole end portion is disposed at the pole end portion of the drive arm 77 so as to face the surface of each magnetic disk 71. The magnetic disk apparatus shown in FIG. 14 demonstrates the effects and advantages described with reference to FIGS. 1 to 8.

Although the content of the present invention has been concretely described in connection with the preferred embodiments, it is self-evident that persons skilled in the art can adopt various kinds of modifications based on the basic technical concept and teachings of the present invention.

What is claimed is:

1. A thin film magnetic head comprising a recording element, wherein:
    the recording element comprises a lower magnetic film, an upper magnetic film, a gap film and a thin film coil;
    the lower magnetic film comprises a lower yoke portion and a lower pole portion, and the lower pole portion is provided at one end of the lower yoke portion that is on the side facing a recording medium;
    the upper magnetic film comprises an upper yoke portion and an upper pole portion;
    the upper yoke portion is provided at a distance from the lower yoke portion, and magnetically coupled with the lower yoke portion by the rear coupling portion that is on the rear side in relation to the side facing a recording medium;
    the thin film coil is provided with an insulating film and arranged between the lower yoke portion and the upper yoke portion;
    the upper pole portion comprises a pole end portion and a pole rear portion, and faces the lower pole portion with the gap film therebetween;
    the pole end portion has a width to define a recording track width;
    the pole rear portion has one end that is magnetically connected with the pole end portion at or in the vicinity of an edge of the insulating film and forms a first flare point at which the width in the track width direction increases, the other end that is connected with the upper yoke portion and forms a second flare point at which the width in the track width direction increases, and both side edges in the track width direction that are inclined so that the width in the track width direction gradually increases from the second flare point toward the first flare point; and
    the width of the pole end portion at the first flare point is smaller than the maximum width of the pole rear portion.

2. The thin film magnetic head of claim 1, wherein:
    the pole rear portion has a portion reducing in width from the maximum-width portion toward the first flare point.

3. The thin film magnetic head of claim 1, wherein:
    the pole rear portion has a forefront edge at the first flare point, the forefront edge defining the maximum width of the pole rear portion.

4. The thin film magnetic head of claim 1, wherein:
    the upper yoke portion and the upper pole portion are formed of a substantially flat and continuous film.

5. The thin film magnetic head of claim 1, wherein:
    the upper yoke portion and the upper pole portion are separated from each other, and the upper yoke portion has an end portion superposed on the upper pole portion.

6. A magnetic head apparatus comprising a thin film magnetic head and a head support device, wherein:
    the thin film magnetic head is defined in claim 1; and
    the head support device supports the thin film magnetic head.

7. A magnetic disk apparatus comprising a magnetic head apparatus and a magnetic disk, wherein:
    the magnetic head apparatus is defined in claim 6; and
    the magnetic disk performs magnetic recording/reproducing operations in cooperation with the magnetic head apparatus.

8. A thin film magnetic head comprising a recording element, wherein:
    the recording element comprises a lower magnetic film, an upper magnetic film, a gap film and a thin film coil;
    the lower magnetic film comprises a lower yoke portion and a lower pole portion, and the lower pole portion is provided at one end of the lower yoke portion that is on the side facing a recording medium;
    the upper magnetic film comprises an upper yoke portion and an upper pole portion;
    the upper yoke portion is provided at a distance from the lower yoke portion, and magnetically coupled with the lower yoke portion by the rear coupling portion that is on the rear side in relation to the side facing a recording medium;
    the thin film coil is provided with an insulating film and arranged between the lower yoke portion and the upper yoke portion;

the upper pole portion comprises a pole end portion and a pole rear portion, and faces the lower pole portion with the gap film therebetween;

the pole end portion has a width to define a recording track width;

the pole rear portion has one end that is magnetically connected with the pole end portion at or in the vicinity of an edge of the insulating film and forms a first flare point at which the width in the track width direction increases;

the pole rear portion is connected with an end portion of the upper yoke portion, and the end portion of the upper yoke portion has a second flare point at which the width in the track width direction increases;

both side edges of the pole rear portion in the track width direction are inclined so that the width in the track width direction gradually increases from the second flare point toward the first flare point; and the width of the pole end portion at the first flare point is smaller than the maximum width of the pole rear portion.

9. The thin film magnetic head of claim 8, wherein:
the pole rear portion has a portion reducing in width from the maximum-width portion toward the first flare point.

10. The thin film magnetic head of claim 8, wherein:
the upper yoke portion and the upper pole portion are separated from each other, and the upper yoke portion has an end portion superposed on the upper pole portion.

11. A magnetic head apparatus comprising a thin film magnetic head and a head support device, wherein:
the thin film magnetic head is defined in claim 8; and
the head support device supports the thin film magnetic head.

12. A magnetic disk apparatus comprising a magnetic head apparatus and a magnetic disk, wherein:
the magnetic head apparatus is defined in claim 11; and
the magnetic disk performs magnetic recording/reproducing operations in cooperation with the magnetic head apparatus.

* * * * *